(12) United States Patent
Buchan

(10) Patent No.: US 9,028,173 B2
(45) Date of Patent: May 12, 2015

(54) SUB-SEA APPARATUS AND OPERATING METHOD

(75) Inventor: Andrew Buchan, Aberdeenshire (GB)

(73) Assignee: Subsea 7 Limited, Sutton (GB)

( * ) Notice: Subject to any disclaimer, the term of this patent is extended or adjusted under 35 U.S.C. 154(b) by 40 days.

(21) Appl. No.: 13/635,111

(22) PCT Filed: Mar. 18, 2011

(86) PCT No.: PCT/GB2011/050549
§ 371 (c)(1),
(2), (4) Date: Feb. 1, 2013

(87) PCT Pub. No.: WO2011/114170
PCT Pub. Date: Sep. 22, 2011

(65) Prior Publication Data
US 2013/0136542 A1    May 30, 2013

(30) Foreign Application Priority Data
Mar. 19, 2010 (GB) .................................. 1004565.6

(51) Int. Cl.
*F16L 55/18*    (2006.01)
*F16L 1/26*    (2006.01)
*E21B 17/02*    (2006.01)

(52) U.S. Cl.
CPC .. *F16L 1/26* (2013.01); *E21B 17/02* (2013.01)

(58) Field of Classification Search
CPC .......... F16L 1/26; F16L 55/18; F16L 55/2658; F16L 3/08; F16L 3/10
USPC .......... 405/184.1, 184.3, 184.4, 158, 169, 170
See application file for complete search history.

(56) References Cited

U.S. PATENT DOCUMENTS 7,445,404 B2 * 11/2008 Giles et al. .................... 405/169

FOREIGN PATENT DOCUMENTS

| EP | 0 733 843 A1 | 9/1996 |
|---|---|---|
| GB | 2276431 | 9/1994 |
| GB | 2304394 | 3/1997 |
| WO | WO 97/15773 | 5/1997 |

* cited by examiner

*Primary Examiner* — Doug Hutton, Jr.
*Assistant Examiner* — Patrick Lambe
(74) *Attorney, Agent, or Firm* — Levy & Grandinetti

(57) ABSTRACT

Apparatus and method for overhauling a flanged coupling of joined conduit components including a gripping mechanism that straddles the flange-coupling and grips both flange-coupled components. The gripping mechanism is mounted on a lifting frame and bears the loadings upon the gripped tubular components during a moving operation. The apparatus also includes a collar sized to fit over the flange-coupling and located in spaced apart cradles supported on a base frame. The cradles are configured to receive the flange-coupled tubular components and position the collar for closure about the flange-coupling. The collar is provided with fasteners for closure of the collar about the flange-coupling, and a fastening mechanism operating the fasteners to secure the collar when closed about the flange-coupling.

13 Claims, 19 Drawing Sheets

SUB-SEA APPARATUS AND OPERATING METHOD

This Application is the U.S. National Phase of International Application Number PCT/GB2011/050549 filed on Mar. 18, 2011, which claims priority to Great Britain Application No. 1004565.6 filed on Mar. 19, 2010.

FIELD OF THE INVENTION

This invention relates to undersea operations typically required to support and maintain exploitation of oil and gas resources. In particular the invention finds application in servicing the infrastructure and submerged facilities required for subsea field development.

BACKGROUND TO THE INVENTION

Whereas exploitation of land-based oil and gas resources may have peaked, the opportunity to expand exploitation of oil and gas resources at offshore and deep water sites remains. This brings many challenges to the industry ranging from exploration to production. Amongst such challenges is the need to recover the produced resources in a consistent and reliable manner with minimal impact upon the environment.

Typically, the exploitation of a subsea field requires subsea deployment of equipment and establishment of a seabed infrastructure for delivery of product. Multiple wells may be established to exploit a reservoir, and these wells generally will be connected to floating production, storage and offloading (FPSO) units by conduits. These conduits may be bundled flowlines serving multiple purposes including production, annulus access and remote control of the wells. These flowlines may be at least partially buried in the seabed. Riser bundles to the FPSO may be installed in free catenaries.

Intervention may be required from time to time to inspect and maintain such subsea structures and systems. Whereas some subsea operations can be conducted by divers, taking account of the extreme depths of many sites, it is becoming more common to use remotely operated vehicles (ROVs) and tooling to perform the necessary tasks. Thus it may be necessary to undertake a subsea task at extreme depth in order to restore control of a subsea system, repair or replace worn or damaged components, override or bypass a failed component, or install sensors to monitor problem areas.

SUMMARY OF THE INVENTION

In the case of need to intervene in a flowline overlying the seabed, (by diver, ROV or otherwise) care must be taken to avoid rupture of the flowline or any connection between the flowline and another component in the system. The present invention provides apparatus and a method for carrying out a remedial operation upon a subsea conduit system with the objective of minimising risk of an unfavourable outcome.

In particular the invention provides an apparatus and procedure for overhauling a flanged-coupling between components of a conduit such as a flowline.

According to the invention there is provided apparatus for overhauling a flanged coupling of joined conduit components comprising a gripping mechanism configured to straddle the flange-coupling and grip both of said flange-coupled components, said gripping mechanism being operatively mounted upon a lifting frame adapted to bear the loadings upon the gripped tubular components during a moving operation, a base frame to be installed upon the seabed to receive and support flange-coupled components for overhaul, said base frame having a support mechanism to receive the flange-coupled components when the lifting frame is properly juxtaposed with the base frame, a collar sized to fit over the flange-coupling and located in spaced apart cradles supported upon the base frame, said cradles being configured to receive the flange-coupled tubular components and position the collar for closure about the flange-coupling, wherein the collar is provided with fasteners for closure of the collar about the flange-coupling, and a fastening mechanism operating the fasteners to secure the collar when closed about the flange-coupling.

The invention also provides a split collar sized to fit over a flange coupling for remedial operations on the flange coupling, the split collar having tensioning devices connecting two collar members to apply an axial force between the collar members to draw them together.

The collar can typically comprise a split collar, adapted to open to allow it to be fitted around the conduit components. Typically the collar comprises at least two spaced apart collar members, each having a split, and typically a hinge mechanism to allow closure of each collar member around the conduit component.

Typically the apparatus of the invention allows remedial operations on a fluid-tight flanged coupling between a first and a second conduit component whilst maintaining the fluid integrity of the coupling.

At least one of the conduit components can be a tubular component.

The moving operation can typically be a lifting operation. The lifting frame can advantageously bear portions of loads on gripped components after the moving operation.

The fasteners can optionally be studbolts and nuts.

The support can have gripping devices.

The cradles may be mounted for both translation and angular orientation to permit the split flange to be brought together along the longitudinal axis of the flange-coupled tubular components, and also rotationally aligned with existing studbolt fasteners in the flange-coupling to be overhauled. In this arrangement, the use of the straddle gripping mechanism typically allows the loadings encountered during a lifting or other movement of the flanged coupling to be transferred through the gripping mechanism to the lifting frame which acts as a load bridge over the flanged coupling and relieves it of excessive loadings during movement which might otherwise cause a shearing or parting of the coupling with loss of fluid-tightness of the coupling.

The lifting frame typically permits axial adjustment of the straddle gripping mechanism either before or after gripping of the components, to move the straddle gripping mechanism towards or away from one another in an axial direction. This assists with alignment and position of the clamps of the straddle gripping mechanism, and can allow the lifting frame to apply compressive force to the flanges to enhance the seal between them, and reduce the risks of fluid loss through the flanged connection during the moving operation.

An advantage of this approach is that the tubular components can continue to serve the intended conduit function allowing "live" or "hot" interventions to an operational system with no down time. The fluid in the conduit can be pressurized or unpressurized.

The lifting frame may be configured for handling by a remotely operated vehicle (ROV) or manually, e.g. by a diver. The lifting frame may be adapted for lifting by a winch or crane, or by a buoyancy device.

Deployment of the frame is typically by a surface crane to lower the lifting frame to the sub sea site and use of an ROV, optionally together with a subsea winch to achieve correct juxtaposition of the frame with respect to the flanged coupling requiring an intervention. In some embodiments, an ROV can recover the frame from a subsea location without the requirement for a winch.

The lifting frame may be provided with a hydraulic (or manual or electrical) system operable by an ROV to control the gripping mechanism.

The gripping mechanism may comprise first and second clamp devices (or more than two) mounted upon the frame and spaced apart sufficiently to be positioned respectively on either side of a flanged coupling when juxtaposed therewith. The first and second clamp devices may comprise adjustable jaws to accommodate differing sizes of tubular components to be lifted.

The first and second clamp devices may be synchronised to grip components at the same time.

The gripping mechanism may be controlled by an operating system that ensures both first and second clamp devices are secured to the respective coupled tubular components on either side of the fluid tight coupling before permitting a lifting or moving operation. The operating system may include contingency override features to effect release of lift clamps in the case of a malfunction. The operating system may include alarm functions to indicate a malfunction.

The lifting frame may be provided with an alignment mechanism for cooperation with a base frame to be installed upon the seabed to allow precise positioning for support of flange coupled components during a remedial operation.

The base frame may also comprise a gripping device to receive the flange coupled components when the lifting frame is properly juxtaposed with the base frame. The base frame may optionally incorporate a cradle device to support the lifting frame and/or the tubular components, typically at a location spaced above a surface of the base frame. Advantageously this facilitates access to the flange around the circumference of the flange.

The invention also provides a method for supporting a flanged coupling between conduit components, the method comprising
gripping the flanged coupling with a lifting frame having a gripping mechanism configured to straddle the flange-coupling and grip both of said flange-coupled components, and applying a load to the lifting frame to move the gripped tubular components during a moving operation,
providing a base frame at an underwater location to receive and support flange-coupled components for overhaul, said base frame having a support structure to receive the flange-coupled components when suitably juxtaposed with the base frame,
moving the lifting frame in relation to the base frame to support the flange-coupled components on the support structure of the base frame,
providing a two-part collar sized to fit over the flange-coupling and locating the collar over the flanged coupling while supported on the base frame, and
closing the two parts of the collar about the flange-coupling and securing them about the flange-coupling.

Typically the support structure on the base frame comprises cradles being configured to receive the flange-coupled tubular components and allow positioning of the collar parts for closure about the flange-coupling.

In an embodiment of the method as applied to a flange coupled flowline laid over a seabed site, a tool for carrying out an intervention such as fitting a supporting collar over defective studbolts on a flange, and a lifting frame equipped with gripping mechanism configured to straddle a flange coupling are delivered to the seabed worksite e.g. by lowering from a surface support vessel crane.

The worksite is typically first surveyed by an ROV to clear debris and possibly to reposition a flowline or umbilical into an optimum position.

Marker positioning aids, such as gabions (sandbags) are typically lowered from the support vessel for positioning beside the target flange-coupled tubular components by use of an ROV or diver with assistance from the vessel crane where required.

A support base frame equipped with a gripping mechanism is then typically lowered to the worksite using the support vessel crane.

The support base frame is typically guided into position by the ROV or diver and installed on the seabed against the gabions.

If necessary, the ROV or diver can perform local seabed dredging operations at the flange connection end fittings to aid installation of the lifting frame.

Optionally a subsea winch is provided for use in the intervention when required, and can optionally be lowered to the worksite by the vessel crane. Winch cables are typically attached and detached by ROV arms. The winch is typically positioned in the correct location by the ROV.

With the aid of the support vessel crane, and the winch when necessary, the ROV moves the lifting frame to position it over the flange connection to straddle same and align the gripping mechanism with the ends of the tubular components. Once properly juxtaposed with the flange-coupled tubular components the gripping mechanism is operated to clamp the lifting frame in place so as to bridge the flange coupling and securely hold the ends of the flange-coupled tubular components.

Typically, with the aid of the vessel crane, and a subsea winch when required, the flange-coupled conduit components are lifted from the seabed and shifted into position on the support frame under the control of the ROV.

The correct mating of the lifting frame with the support frame may be achieved by provision of docking posts and cone sockets on the respective frames.

Upon completion of the lift and shift tasks the ROV typically operates the support frame gripping mechanism to grip the ends of the respective flange-coupled tubular components. The lifting frame may be removed once the support gripping mechanism is activated to hold the flange-coupled tubular component ends securely.

The support collar assembly is then lowered from the vessel or recovered from seabed storage by the ROV, and is opened to allow fitting over the flange coupling.

Typically the support collar assembly has a two pairs of split flanges, each pair connected together to move with one another, and the two pairs being pre-loaded with replacement fastenings such as stud bolts provided in radially spaced holes that are arranged to lie radially outside the existing fastenings on the flange coupling when the support collar assembly is connected to the flange coupling.

The existing fastenings on the flange coupling are typically received within axial recesses on the innermost collar member on each pair, so that the collar applies forces to the flanges and not to the existing fastenings, which remain in place on the flange coupling.

The ROV typically operates support frame tooling to close clamp devices around the flange coupling to secure it in place. The ROV then typically operates the support frame tooling to close the split flange of the collar assembly around the flange coupling and to rotationally align the collar assembly with the existing flange studbolts, so that the studbolts are aligned with the axial recesses of the collar assembly. When the collar assembly is in place around the flange and existing studbolts extending through the flange coupling are aligned with the recesses of the collar assembly the ROV then typically operates the support frame tooling (e.g. the tensioner & nut runner tooling cradle) to bring the collar assembly on each side into contact with the existing flange, to receive the existing studbolts and nuts within the recesses on the collar assembly.

Typically the support collar has tensioning devices of known construction to facilitate tensioning of the new fastenings. The tensioning devices on circumferentially adjacent fastenings can optionally be provided on alternating pairs of collar members.

The nut runners or other tensioners on the collar assembly are then typically operated to bring the nuts into contact with the collar assembly and the new studbolts connecting the two pairs of collar members are then stretched and final nut running operations are performed to lock the studbolts in tension and clamp the collar assembly around the flange coupling. The collar assembly applies compressive force to the flanges, and does not typically apply any forces to the existing fastenings, received within the axial recesses. Thus the flanges are pressed together by the flat inner faces of the collar members, which spreads the surface area providing the loading, and allows the application of greater compressive forces, to mitigate possible leaks arising from decay or failure of the existing fastenings. The compressive force is transmitted entirely by the collar members and the new fastenings, which can optionally be of superior grades of metal or other material to reduce the likelihood of premature failure.

The collar assembly is unlocked from the support cradles on the frame, which are retracted to release the collar assembly now connected firmly to the flange. The worksite is typically de-rigged and all equipment typically recovered to the support vessel in a reverse of the set-up sequence. The flowline complete with the collar assembly is also typically returned to its original position on the seabed. The ROV typically performs a final visual inspection of the worksite.

DESCRIPTION OF EMBODIMENTS OF THE INVENTION

Figure 1:
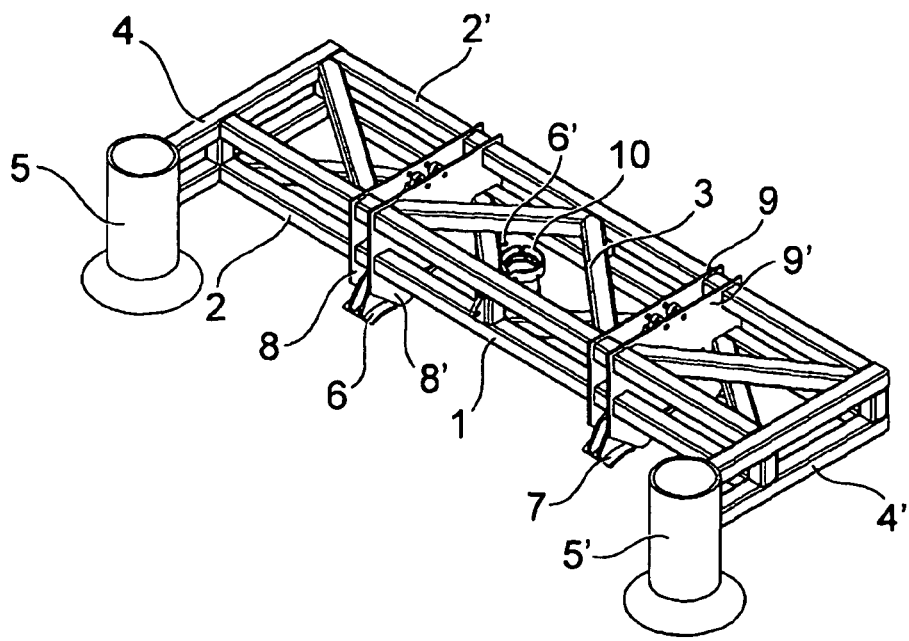
FIG. 1 shows a perspective view from above and to the rear of a lifting frame equipped with spaced apart gripping clamps.
Figure 2:
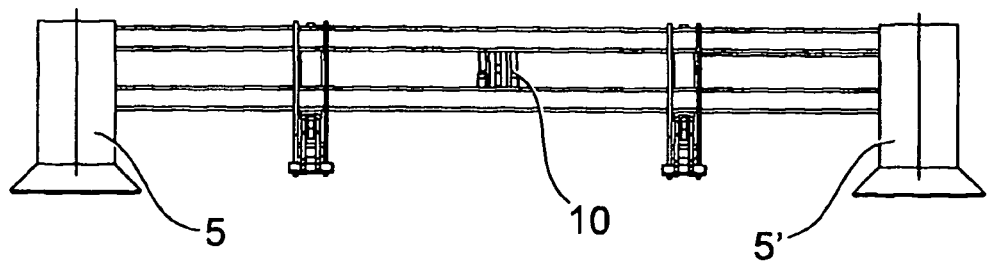
FIG. 2 shows a rear elevation of the lifting frame illustrated in FIG. 1.
Figure 3:
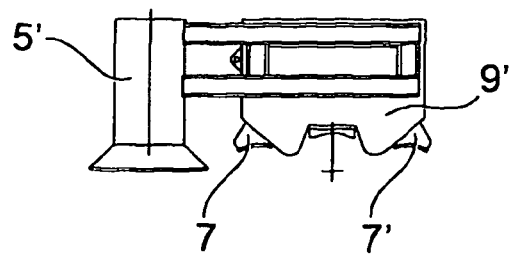
FIG. 3 shows an end elevation of the lifting frame illustrated in FIGS. 1 and 2.

Referring to FIG. 1, there is shown a lift clamp 1 designed to support a fluid-tight flange connection end-fitting and act as a "strong-back" to reduce the risk of leakage by minimising the exposure of the existing flange connection fastener, typically stud bolts and nuts, to loads imparted during an operational handling step; in particular those generated during a lift and shift sequence.

The lift clamp 1 comprises a rectangular box frame made from front and rear tubular members 2, 2' with angled cross tie members 3, and side members 4, 4', with docking installation guide cones 5, 5' attached to the respective side members 4, 4'.

A gripping mechanism for engaging an end of a first and second tubular component on either side of a flange connection between tubular components of a flowline (not shown) includes paired clamp jaws 6, 6' and 7, 7' operatively mounted between respective transverse mounting plates 8, 8' and 9, 9'. Hydraulic lines (not shown) for operation of the clamp jaws under the control of a hydraulic system of a ROV are connectable to the gripping mechanism to allow clamping of the ends of the first and second tubular components. Both gripping devices on the gripping mechanism are typically engaged before any movement of the flange-coupled tubular components is contemplated but the gripping mechanism can be operated independently and sequentially or synchronised for simultaneous operation.

The lift clamp 1 is fitted with a hydraulic stabplate receptacle 10 to allow the mating of a corresponding hydraulics line connector on an ROV and subsequent operation of the lift clamp. The position of the gripping devices of the lift clamp gripping mechanism and the clamp jaw grip radius can be adjustable and altered prior to subsea operations to accommodate different sizes of flange connection end fittings. This can optionally be used after gripping to apply compression to the flange coupling.

The lift clamp 1 is designed to bridge the flange-coupling to engage the ends of the flange-coupled tubular directly and relieve potential loadings upon the flange coupling during a lift and shift operation and thereby minimise risks of shear or parting of the flange-coupling during the operation and maintain the fluid-tight condition of the flange-coupling. Thus the flowline can remain in productive use throughout the intervention.

The lift clamp is used to remove the flowline from the seabed to allow access to the flange-coupling by appropriate tools. In order to facilitate this purpose, a base support frame 20 is provided for the flowline.

Figure 4:
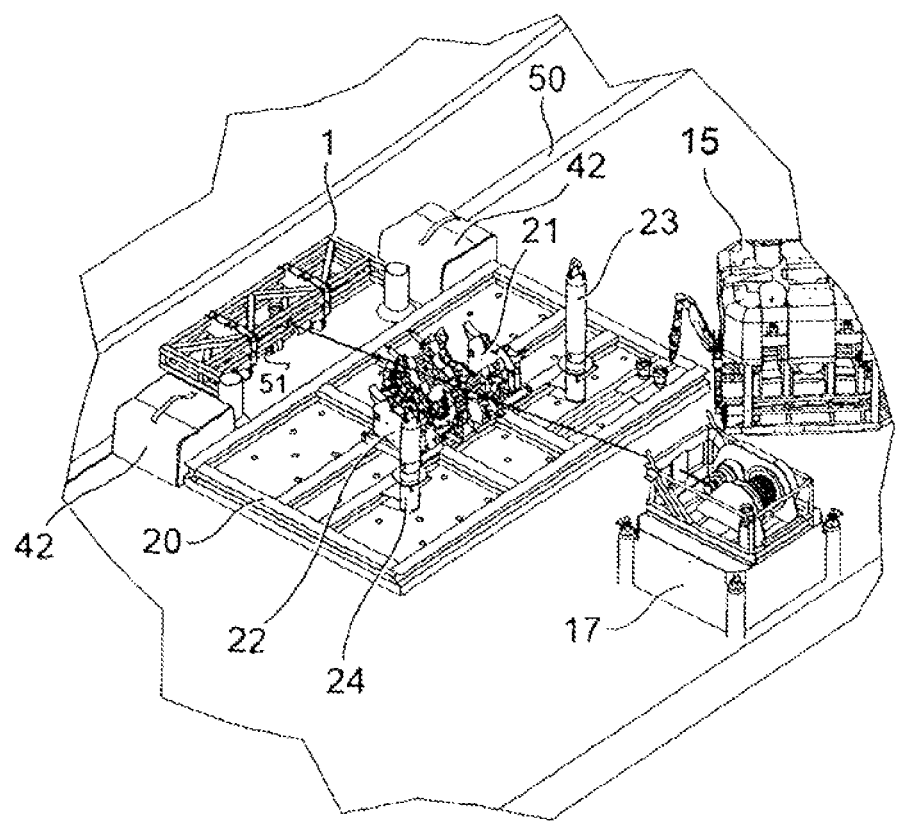
FIG. 4 shows a perspective view from above and to the front of a base frame in position at the worksite with spaced apart gripping clamps and open cradles with split flange ready for receipt of a flange-coupled conduit.
Figure 8:
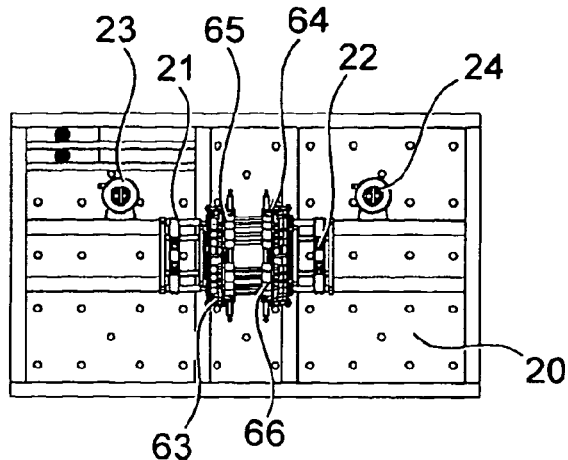
FIG. 8 shows the base plate of FIG. 5 in plan view.

Referring now to FIG. 4, the base support frame 20 has paired upstanding gripping devices 21, 22 spaced apart sufficiently on the support frame 20 to admit the gripped flange-coupling presented by the lift clamp therebetween and allow the jaws of the respective gripping devices 21, 22 to be closed upon the respective ends of the flange-coupled tubular components of the flowline.

The base support frame 20 is equipped with upstanding docking guide posts 23, 24 for cooperation with other equipment to be installed thereon. Two hydraulics stabplate receptacles are provided for connection of a hydraulics control system. The hydraulics can optionally be controlled from an ROV 15, for example, to allow the gripping means 21, 22 to be remotely operated from the ROV 15.

The lift clamp 1 may be moved to locate upon the base support frame 20 with the assistance of a subsea winch 17.

Figure 5:
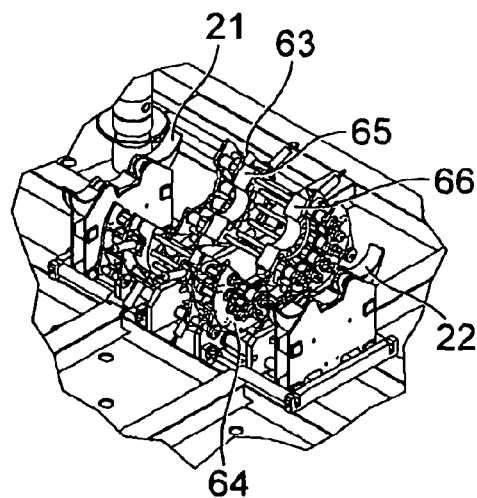
FIG. 5 shows an enlarged perspective view from above and to the front of a base frame equipped with spaced apart gripping clamps and open cradles bearing split flange parts.
Figure 6:
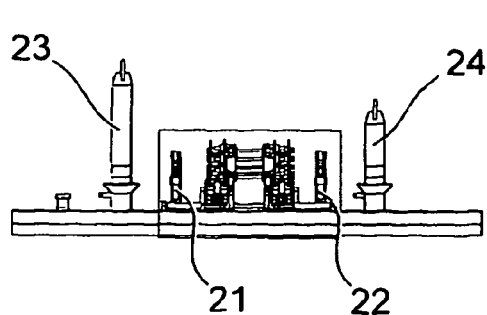
FIG. 6 shows a front elevation of the base frame illustrated in FIG. 5.
Figure 7:
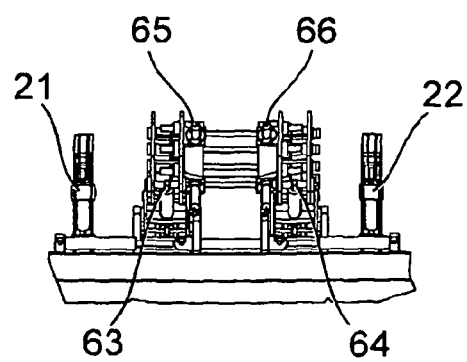
FIG. 7 shows an enlarged front elevation of the gripping clamps and open cradles bearing split flange parts mounted on the base frame illustrated in FIGS. 5 and 6.
Figure 9:
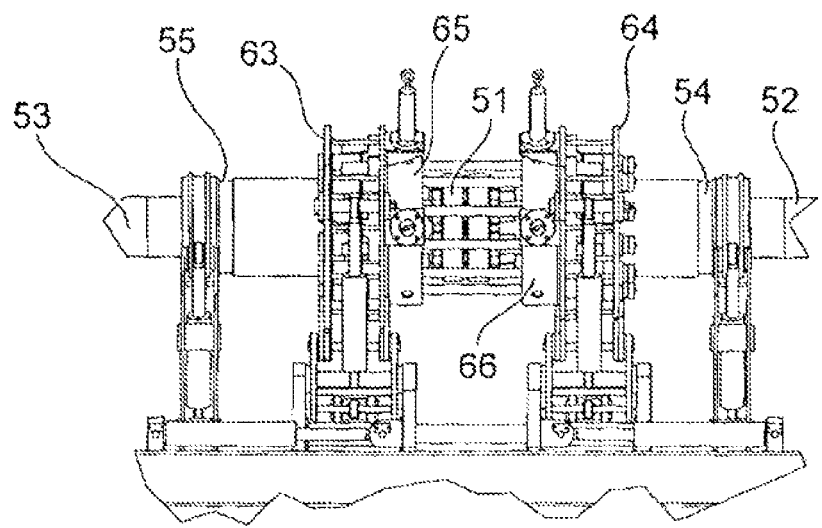
FIG. 9 shows enlarged front elevation of the gripping clamps and cradles bearing split flange parts with split flange parts ready to be closed upon a flange-coupling connecting two tubular components of a flowline.

Tooling is mounted upon the base support frame 20 to install a split flange 65, 66 (See FIG. 5) over a flange-coupling 51 to be overhauled. The tooling comprises movable cradles 63, 64 mounted for translation and angular orientation to allow the split flange parts 65, 66 to be brought together and closed about a flange-coupling 51 when gripped upon the base support frame 20, and also rotationally oriented to allow registry with existing fastener studbolt heads in the flange-coupling 51 to be overhauled.

Referring again to FIG. 5, the split flange parts 65, 66 are presented in the cradles with the requisite number of over-length studbolts in place for subsequent use in fastening the split flange parts 65, 66 about the flange-coupling 51. The studbolts are over-length to allow the use of a stud-tensioner and nut runner associated with one of the cradles to fasten the split flange about the flange-coupling 51.

In a proposed use of the apparatus for overhauling a flanged-coupling between tubular components of a conduit such as a flowline, the following operations are contemplated.

A remotely operated vehicle (ROV) 15 is used to inspect the proposed worksite where an intervention upon a flange-coupling in a conduit to effect remedial work is contemplated. The ROV 15 may be used to clear any debris or obstructions preventing access to the flange connection. This could include having to reposition a flowline or umbilical. The operational apparatus including the lift clamp 1, base support frame 20 with required tooling and split flange 65, 66 are lowered from a support vessel and wet stored on the seabed in a convenient location adjacent to the worksite. More than one ROV may be used or at least an additional ROV may be on station for use to assist another if required.

Gabions 42 (sandbags) are lowered from the support vessel in a work basket and wet stored on the seabed in a convenient location adjacent to the worksite at a flowline 50, with fluid tight flange-coupling 51 connecting tubular components 52, 53, of the flowline 50.

With assistance from the vessel crane as required, the gabions 42 are typically positioned by the ROV against the target flowline 50 to aid the subsequent positioning and installation of the flange-coupling handling and intervention tool apparatus.

Referring to FIG. 4 in conjunction with FIG. 1, the base support frame 20 is guided into position by the ROV and installed on the seabed against the gabions 42. If necessary, the ROV performs local seabed dredging operations at the flange connection end fittings to aid installation of the lift clamp 1.

A subsea winch 17 may be lowered to the worksite by the support vessel crane and the ROV may position the subsea winch on the seabed appropriately.

With the aid of the support vessel crane the ROV recovers the lift clamp 1 and positions it over the flange coupling 51 so that gripping means 6, 7 thereof are respectively aligned over the coupled end fittings of the tubular components making up the flowline 50 and operated to clamp the lift clamp 1 in place upon the flowline to hold the flange-coupled tubular component ends securely.

A first ROV may attach a subsea winch wire to the lift clamp 1 whilst another ROV operates the subsea winch 17.

With the aid of the vessel crane and subsea winch 17 the flowline 50 is lifted from the seabed and shifted into position on the support frame 20 using the guide posts 23, 24 to locate it within the capture of the support frame clamp jaws 21, 22.

Figure 10:
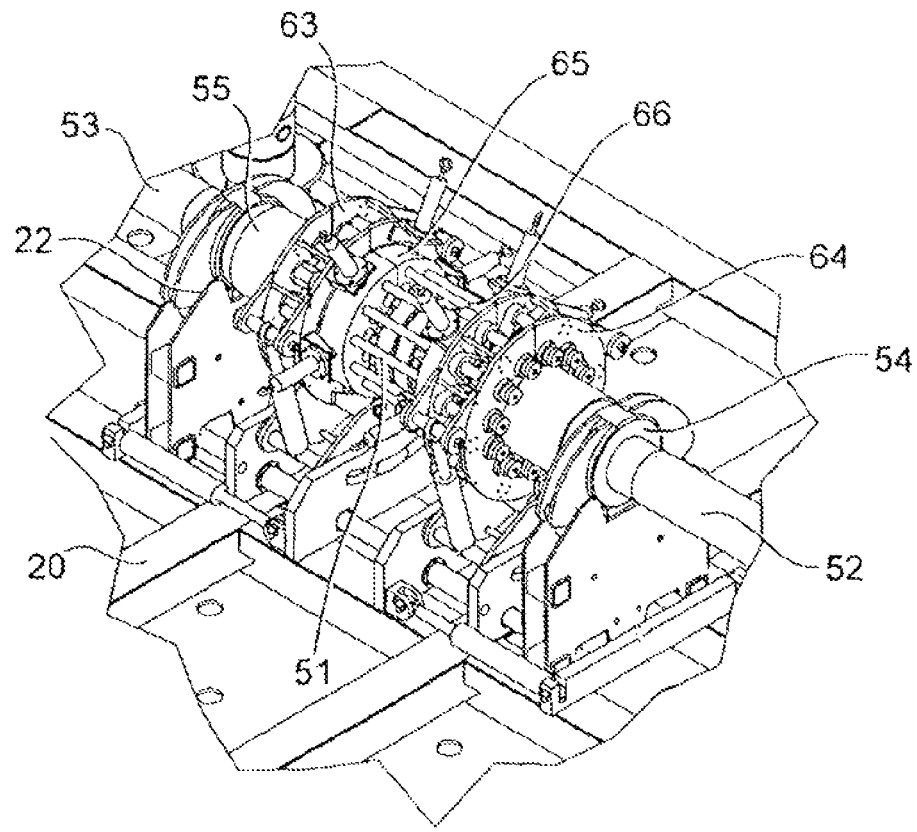
FIG. 10 shows an enlarged perspective view from above and to the front of the gripping clamps and cradles with split flange parts ready to be closed upon a flange-coupling connecting two tubular components of a flowline.
Figure 11:
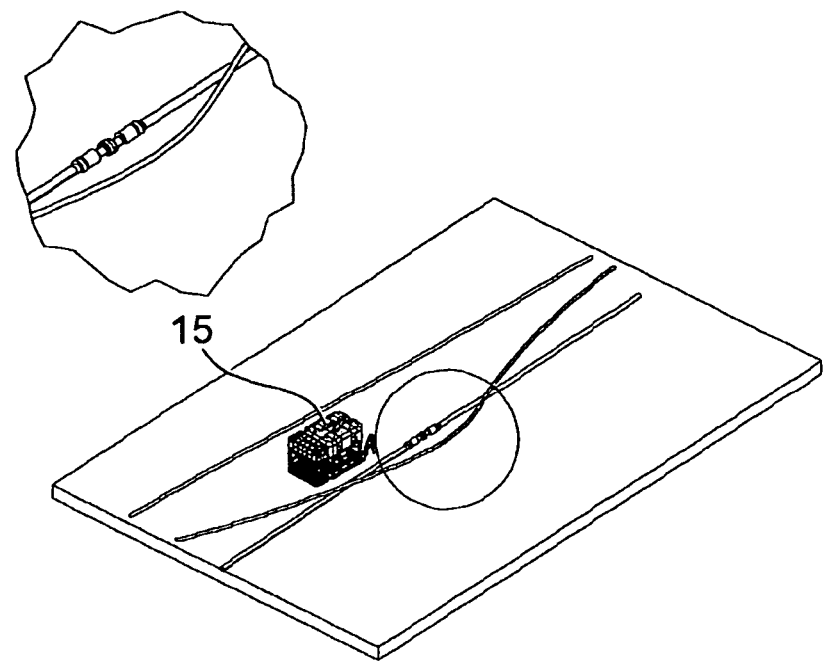
FIGS. 11-30 show sequential views of an operation using the apparatus to lift a seabed flowline and fit a collar assembly around the flange.
Figure 12:
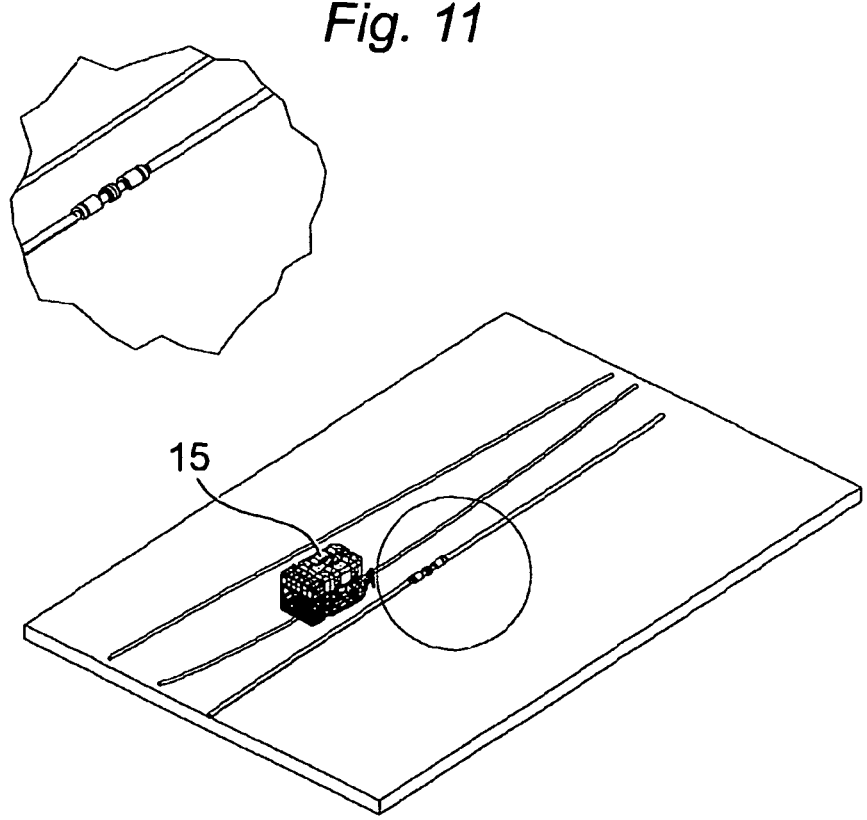
Figure 13:
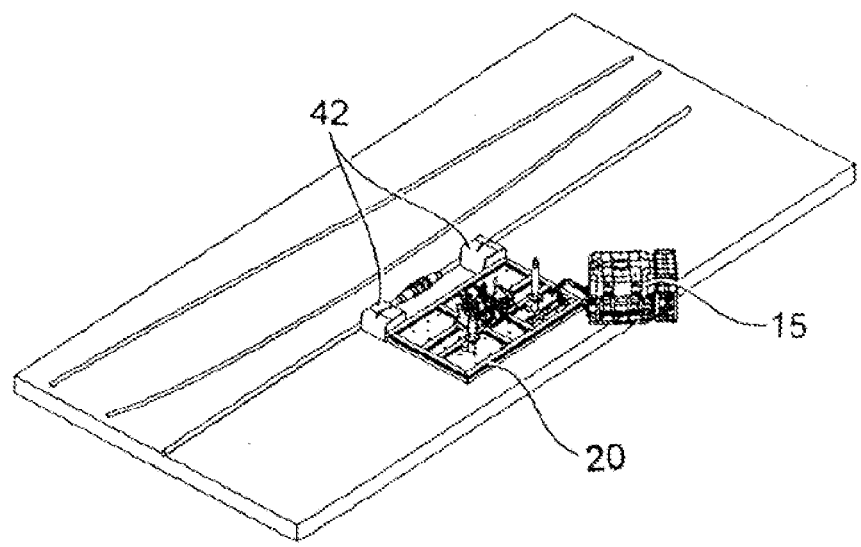
Figure 14:
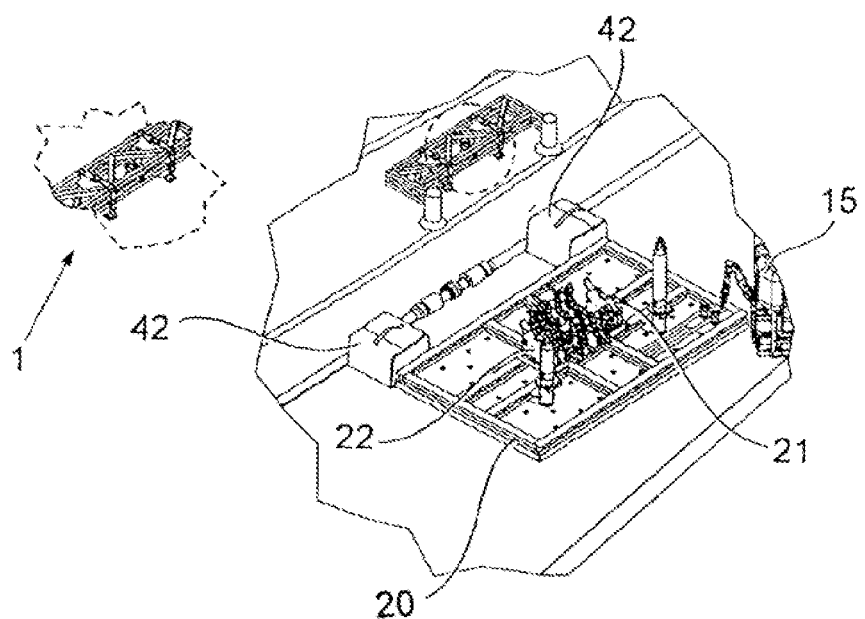
Figure 15:
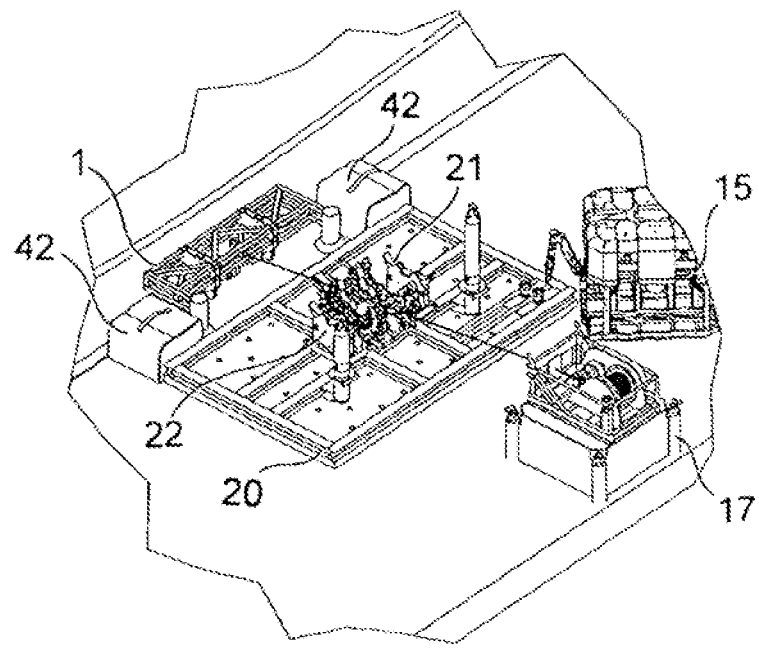
Figure 16:
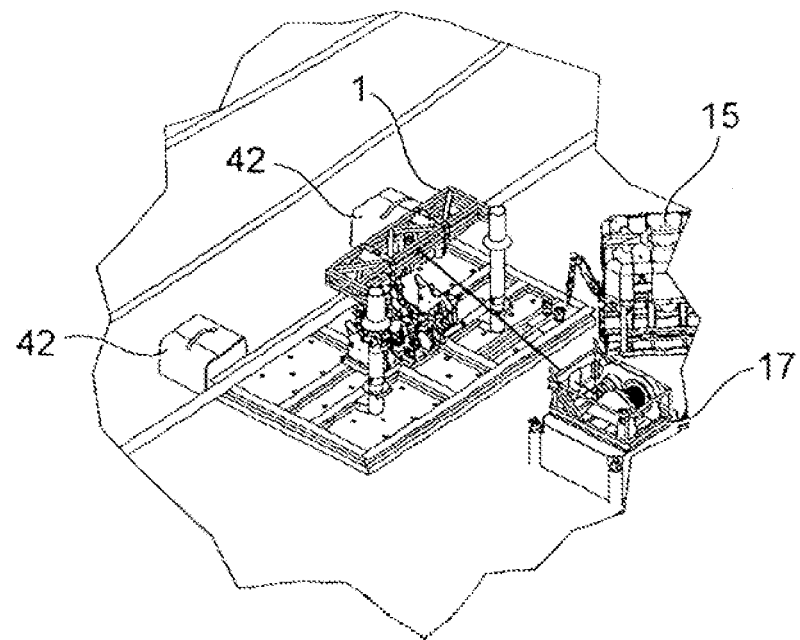
Figure 17:
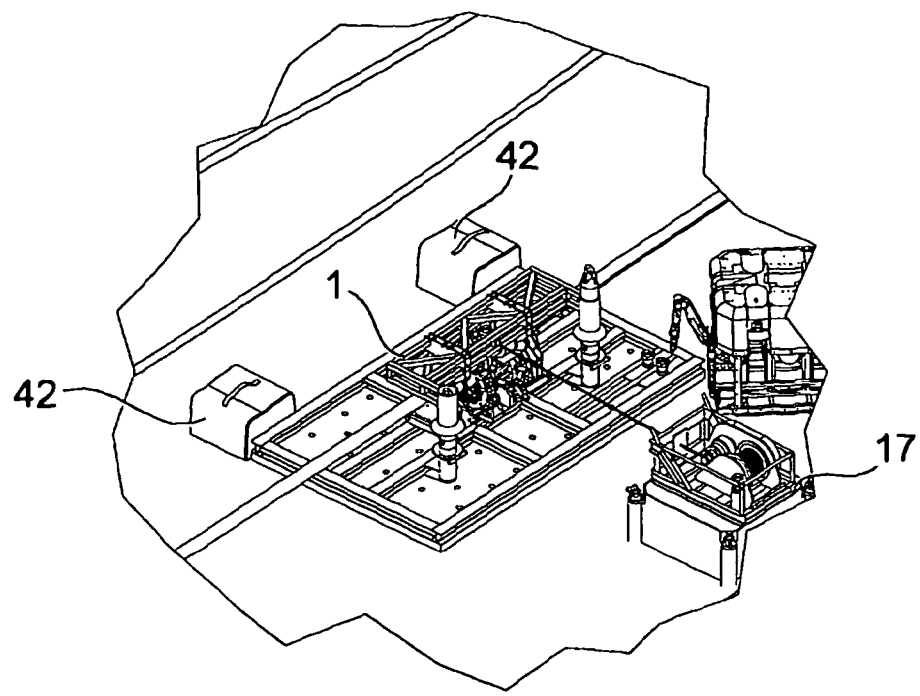
Figure 18:
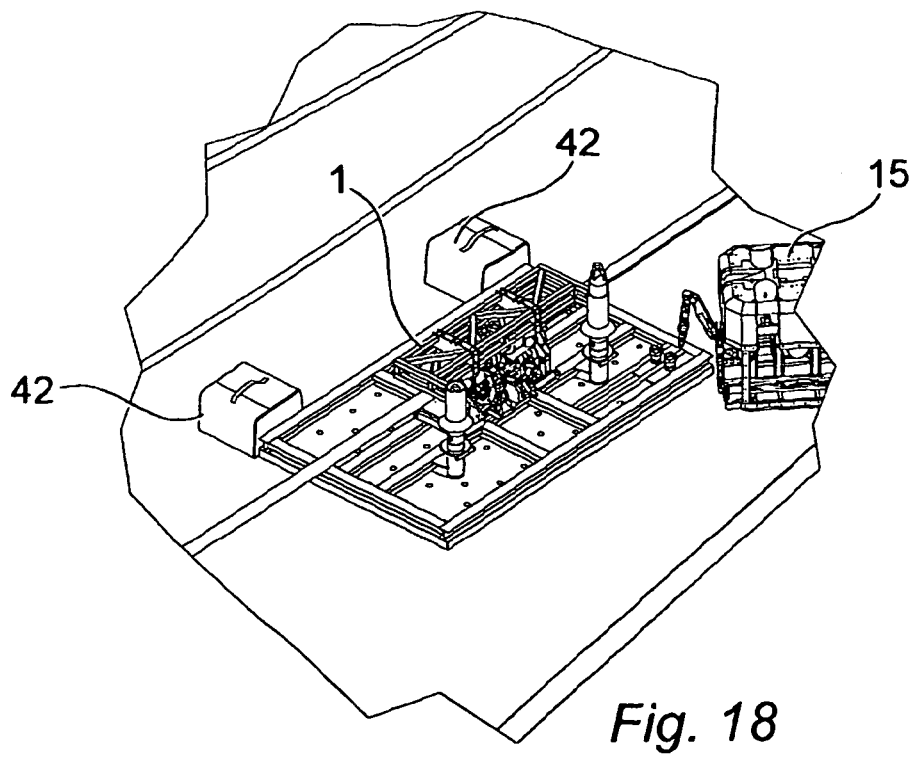
Figure 19:
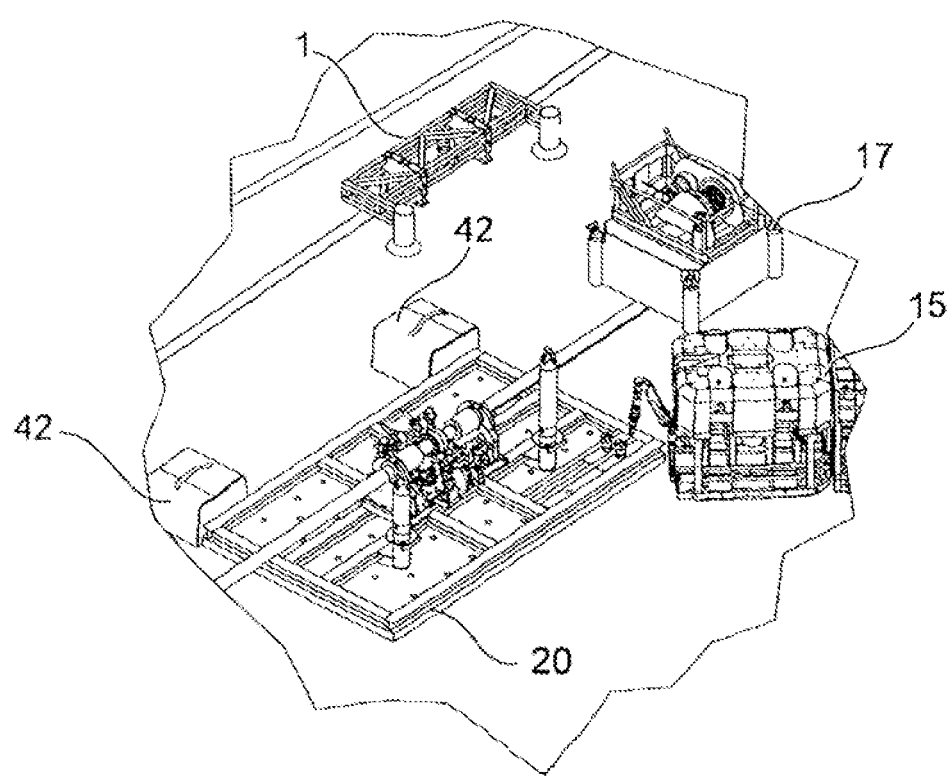
Figure 20:
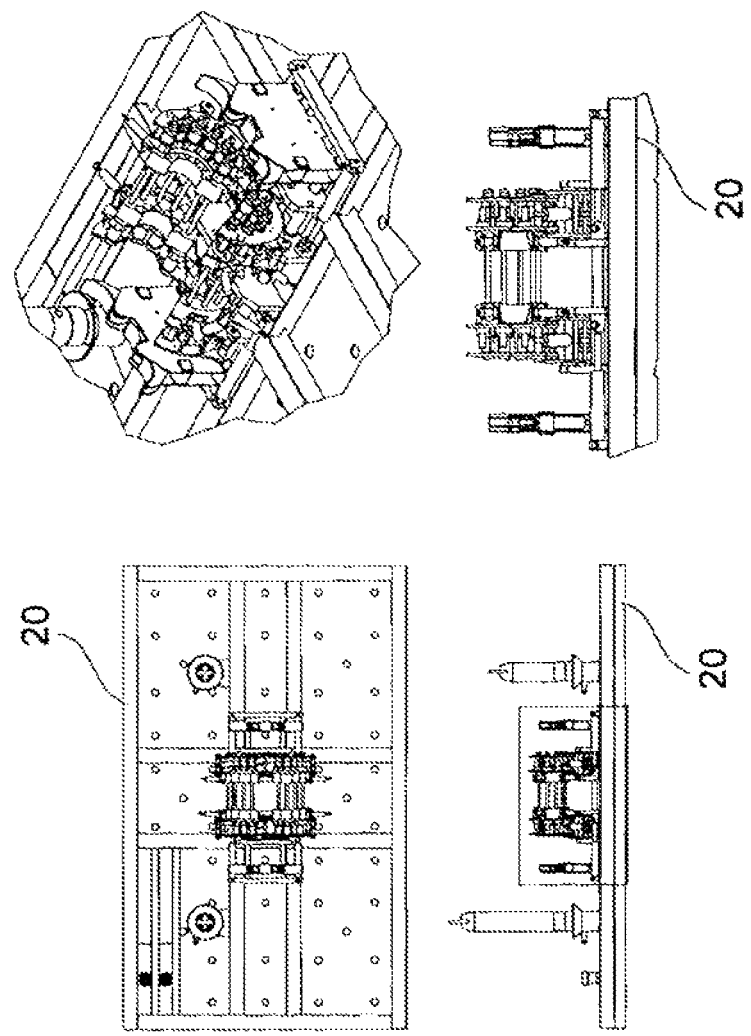
Figure 21:
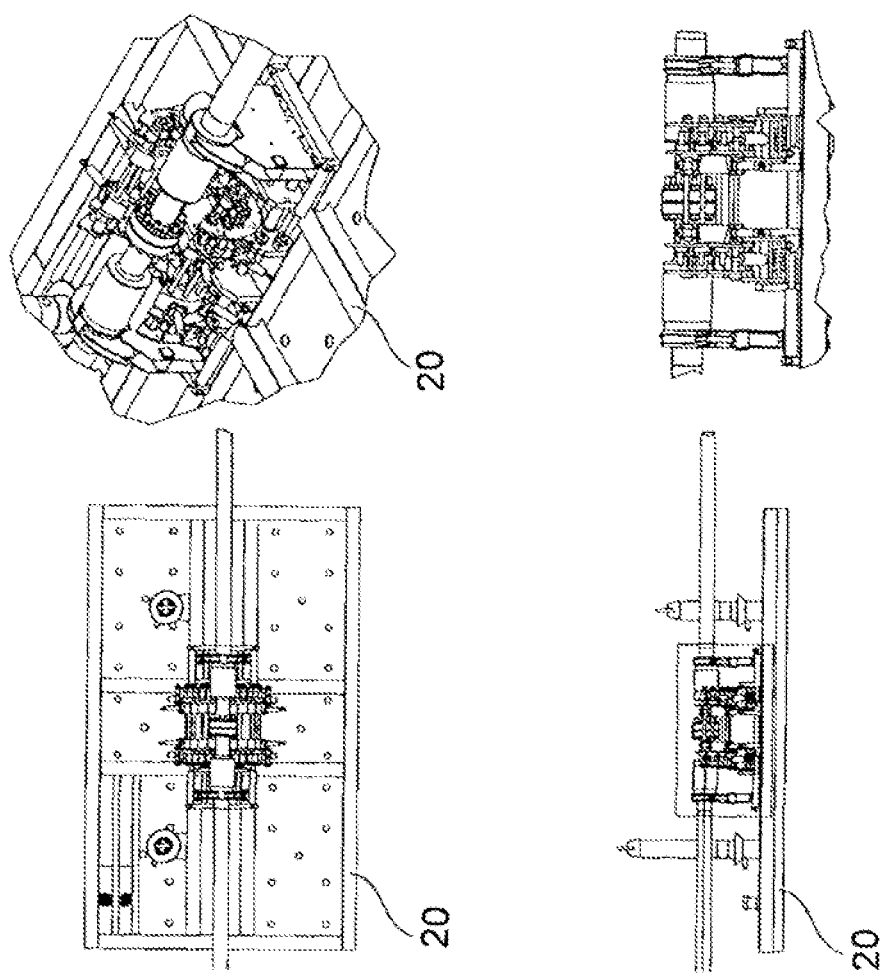
Figure 22:
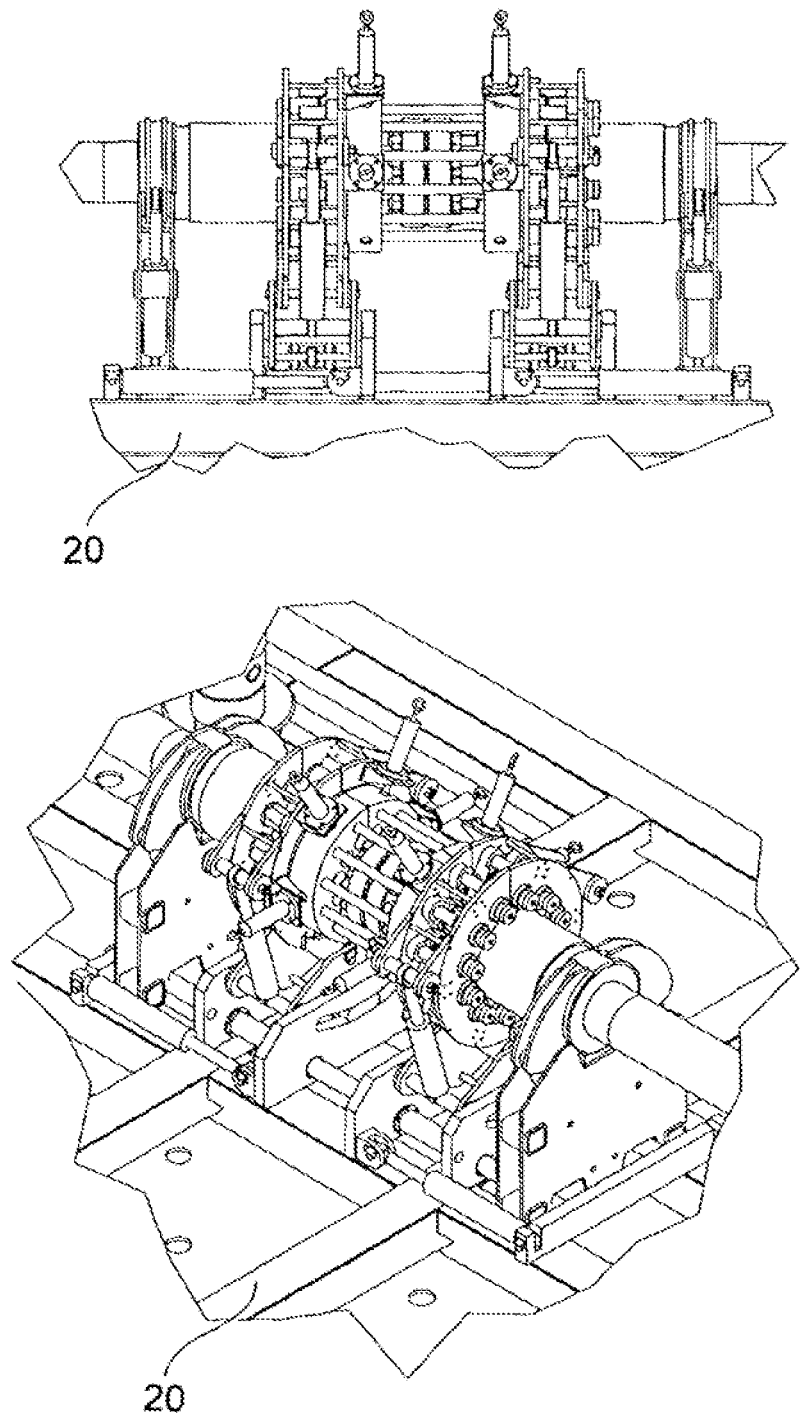
Figure 23:
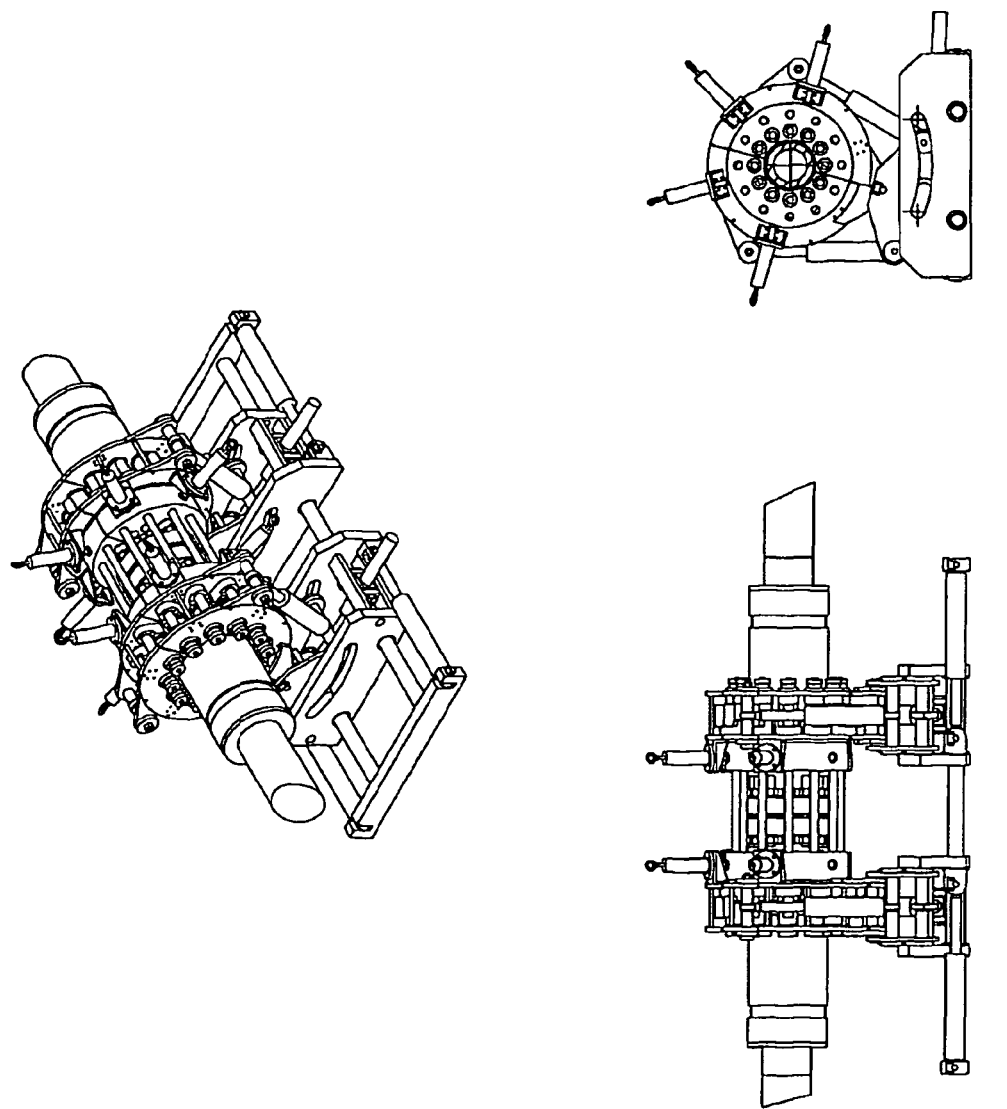
Figure 24:
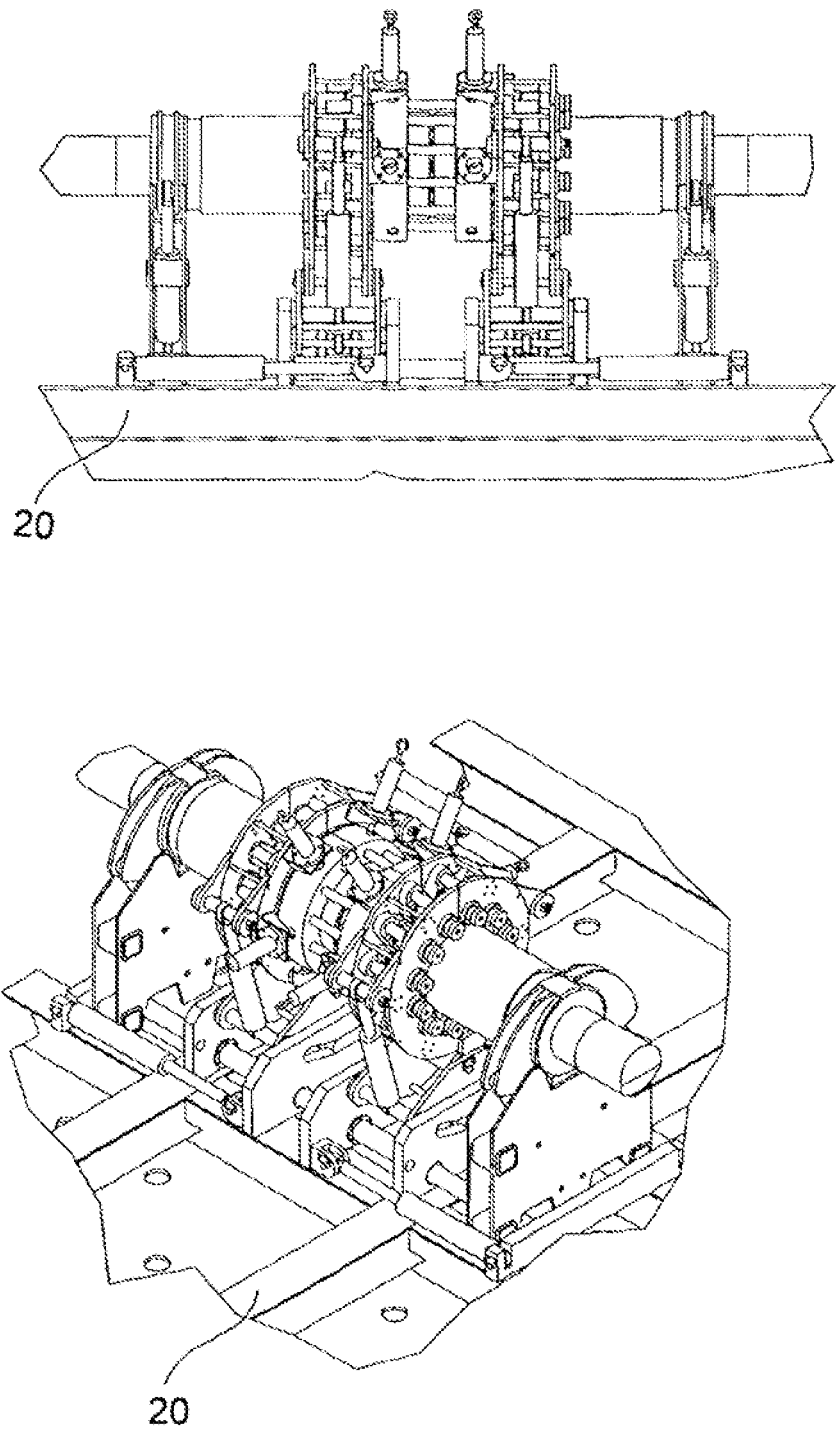
Figure 25:
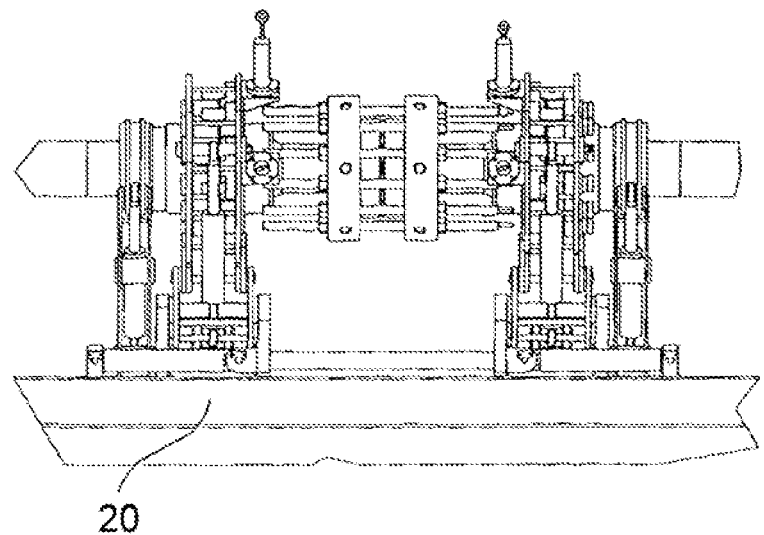
Figure 25:
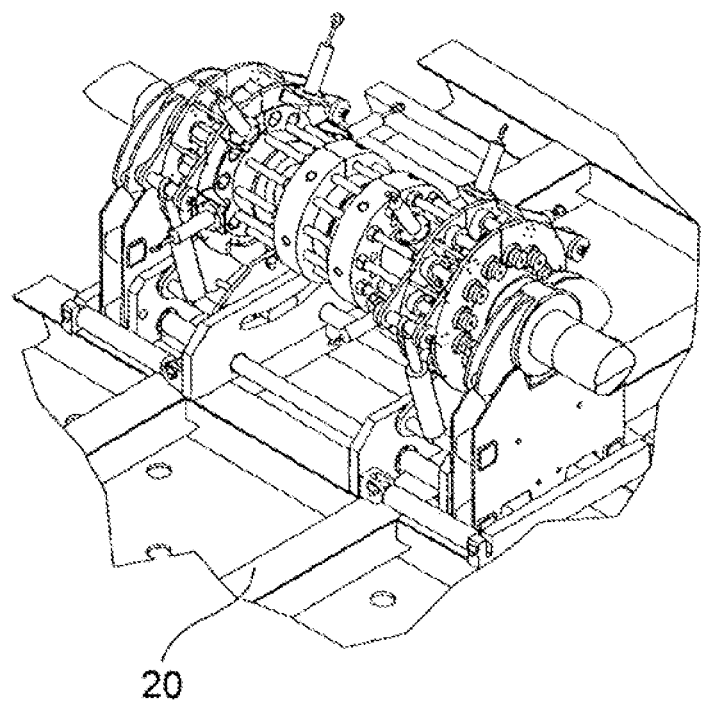
Figure 26:
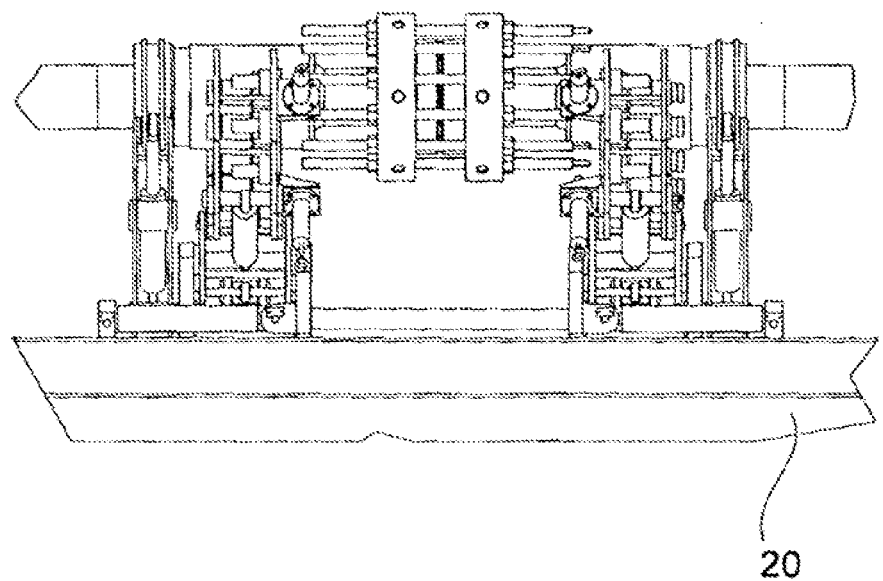
Figure 26:
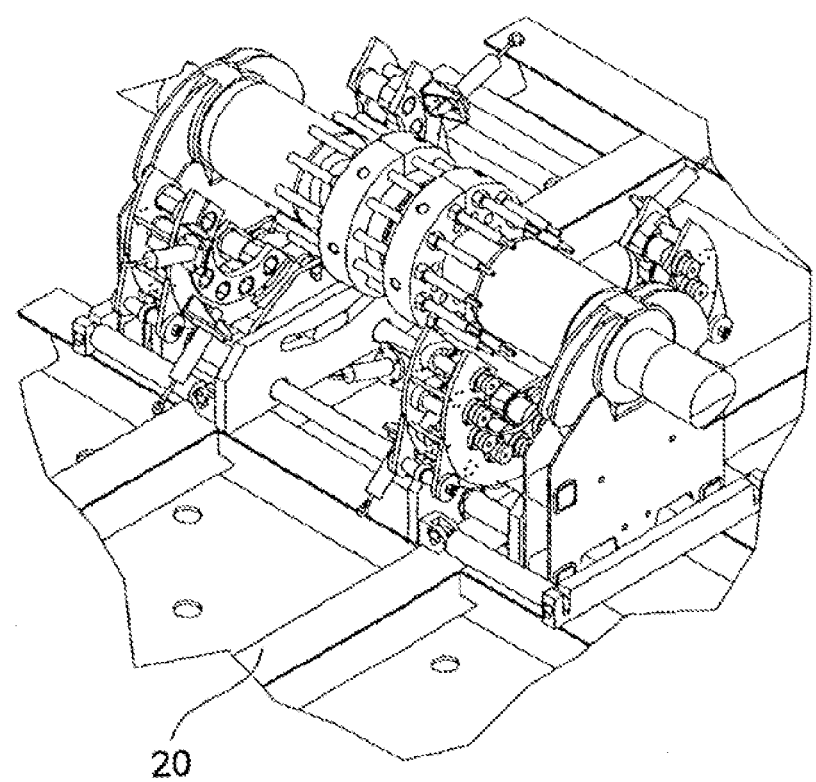
Figure 27:
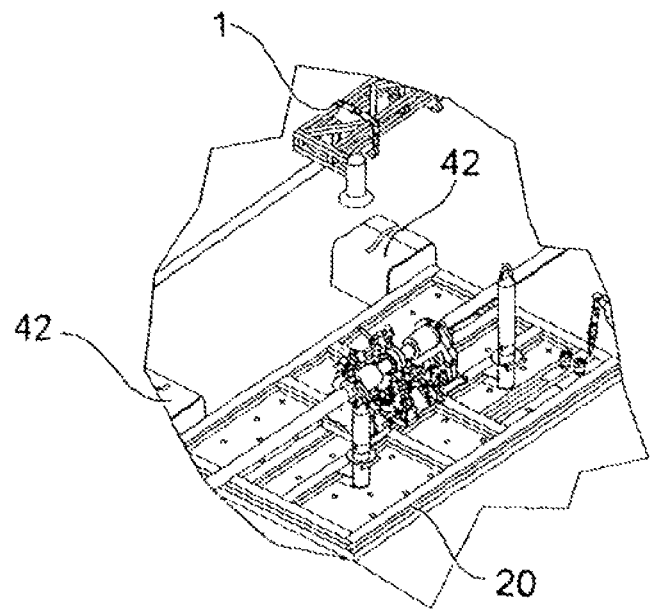
Figure 28:
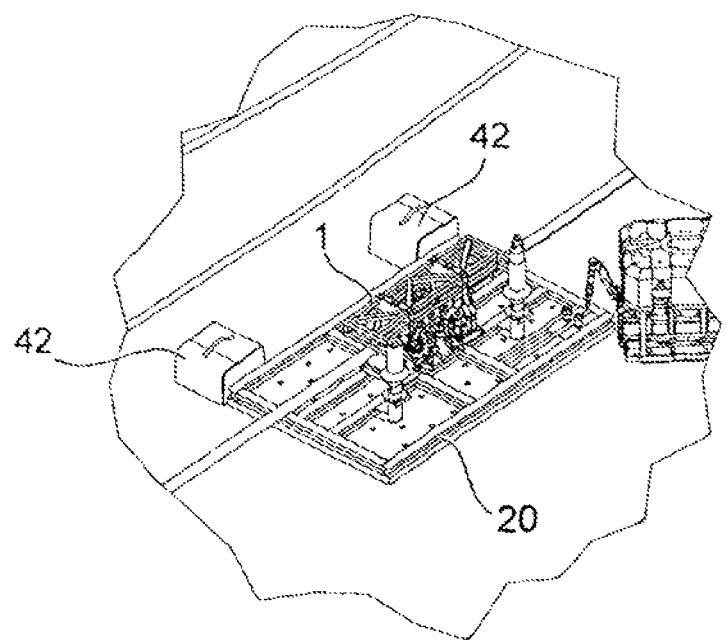
Figure 29:
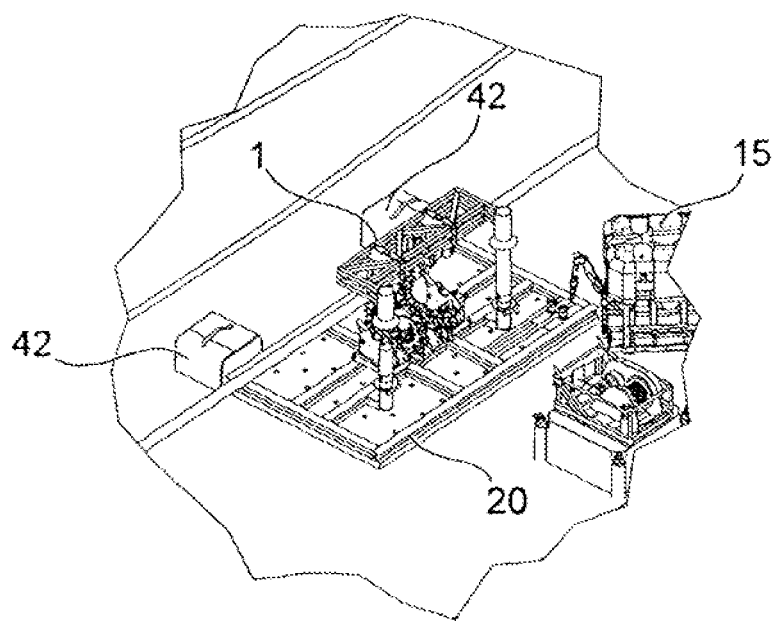
Figure 30:
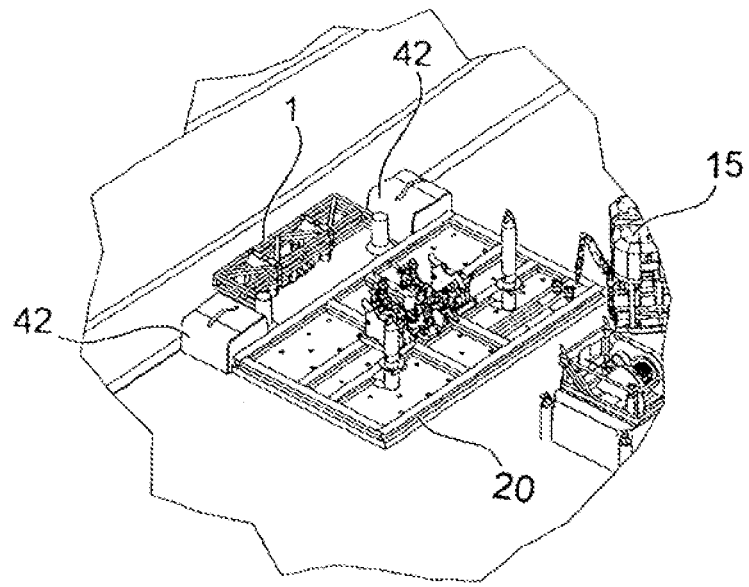

Upon completion of the flowline lift and shift the ROV typically operates the support frame clamps 21, 22 to grip the respective tubular component end fittings 54, 55 (FIG. 10).

The ROV typically disconnects the subsea winch wire from the lift clamp 1. The ROV releases the lift clamp 1 from the respective tubular component ends 54, 55 and, using the vessel crane, removes the lift clamp 1 from the support frame 20 to be set aside near the work site for later use.

The ROV may then operate the cradle to bring the split flanges together and rotate as necessary to bring the split flange into registry with the studbolt heads of the flange-coupling being overhauled. In this way the split flange is dosed about the existing flange-coupling. The stud tensioner and nut runner is operated to fasten the split flange securely and lock in the requisite tension.

Positioning rods holding the split flange parts into the cradles are removed and the flange cradles are firstly retracted axially until clear of the split flange studbolts, and then radially to clear the dosed split flange.

The lift clamp 1 is returned to pick up the overhauled flowline and the base support frame 20 gripping means 21, 22 are released to allow the overhauled flowline complete with new split flange over the original flange-coupling to be restored to the original site. The worksite can then be de-rigged and all equipment recovered to the support vessel in a reverse of the set-up sequence.

A final inspection of the worksite may optionally be conducted using the ROV.

Variations of the described method may be employed to suit operational requirements.

The invention claimed is:

1. An apparatus for overhauling a flanged coupling of joined conduit components, the apparatus comprising:
    a lifting frame having a gripping mechanism operatively mounted thereon, wherein the gripping mechanism is configured to straddle the flanged coupling and to grip both of said joined conduit components, wherein the lifting frame is adapted to support the joined conduit components gripped by the gripping mechanism during lifting of the joined conduit components to prevent loading on the flanged coupling;
    a base frame adapted to be installed upon the seabed to rest on the seabed to receive and support joined conduit components for overhaul from the lifting frame and wherein said base frame comprises a support to receive the joined conduit components when the lifting frame is coupled with the base frame and
    a collar sized to fit over the flanged coupling and located in spaced apart cradles supported upon the base frame, wherein said cradles are configured to receive the joined conduit components and to position the collar for closure about the flanged coupling, wherein the collar is provided with fasteners for closure of the collar about the flanged coupling, and a fastening mechanism adapted to operate the fasteners to secure the collar when closed about the flanged coupling;
    wherein the lifting frame and the base frame have a releasable coupling such that the lifting frame is located on the base frame when the lifting frame and the base frame are coupled and such that the lifting frame and the base frame are not connected to each other when the lifting frame and the base frame are uncoupled.

2. The apparatus as claimed in claim 1, wherein the cradles are mounted for both translation and angular orientation to permit split flanges of the collar to be brought together along the longitudinal axis of the joined conduit components, and also rotationally aligned such that any existing studbolt fasteners in the flanged coupling may be overhauled.

3. The apparatus as claimed in claim 2, wherein the collar comprises tensioning devices connecting the split flanges of the collar to apply an axial force between the split flanges to draw them together.

4. The apparatus as claimed in claim 3, wherein the collar comprises at least two split flanges, each having a split and a hinge mechanism to allow closure of each split flange around one of the conduit components.

5. The apparatus as claimed in claim 1, wherein the lifting frame is configured to allow axial adjustment of the gripping mechanism with respect to the flanged coupling either before or after gripping of the joined conduit components.

6. The apparatus as claimed in claim 5, wherein the gripping mechanism comprises at least first and second clamp devices mounted upon the lifting frame and spaced apart sufficiently to be positioned respectively on either side of the flanged coupling when juxtaposed therewith.

7. A method for supporting a flanged coupling between joined conduit components using a lifting frame and a base frame, the method comprising:

gripping the flanged coupling with the lifting frame, the lifting frame being decoupled from, and not connected to, the base frame and having a gripping mechanism configured to straddle the flanged coupling and to grip both of said joined conduit components, and applying a load to the lifting frame to move the gripped joined conduit components during a lifting operation, wherein the lifting frame supports the joined conduit components gripped by the gripping mechanism during lifting of the joined conduit components to prevent loading on the flanged coupling, providing the base frame to rest on a seabed at an underwater location to receive and support the joined conduit components for overhaul, said base frame having a support structure to receive the joined conduit components when suitably juxtaposed with the base frame, moving the lifting frame to couple the lifting frame to the base frame, and supporting the joined conduit components on the support structure of the base frame, providing a collar sized to fit over the flange-coupling and locating the collar over the flanged coupling while supported on the base frame, wherein the collar has at least two split parts, and closing the split parts of the collar about the flanged coupling and securing them about the flanged coupling.

8. The method as claimed in claim 7, wherein the collar is lowered from a surface support vessel and wherein the collar comprises at least two pairs of split parts, each pair connected together to move with one another, and the two pairs of split parts being pre-loaded with replacement fastenings provided in radially spaced holes that are arranged to lie radially outside the existing fastenings on the flange coupling when the collar is connected to the flange coupling.

9. The method as claimed in claim 8 wherein the collar is positioned such that existing fastenings on the flange coupling are received within axial recesses in flat inner faces of the collar so that the collar applies forces to the flanges and not to the existing fastenings, which remain in place on the flanged coupling.

10. The method as claimed in claim 9, wherein replacement fastenings are tensioned or tightened to secure the collar about the flanged coupling being overhauled.

11. The method as claimed in claim 7 wherein the collar is positioned such that existing fastenings on the flange coupling are received within axial recesses in flat inner faces of the collar so that the collar applies forces to the flanges and not to the existing fastenings, which remain in place on the flanged coupling.

12. The method as claimed in claim 11, wherein replacement fastenings are tensioned or tightened to secure the collar about the flanged coupling being overhauled.

13. The method as claimed in claim 7, further comprising uncoupling the lifting frame from the base frame.

\* \* \* \* \*